UNITED STATES PATENT OFFICE.

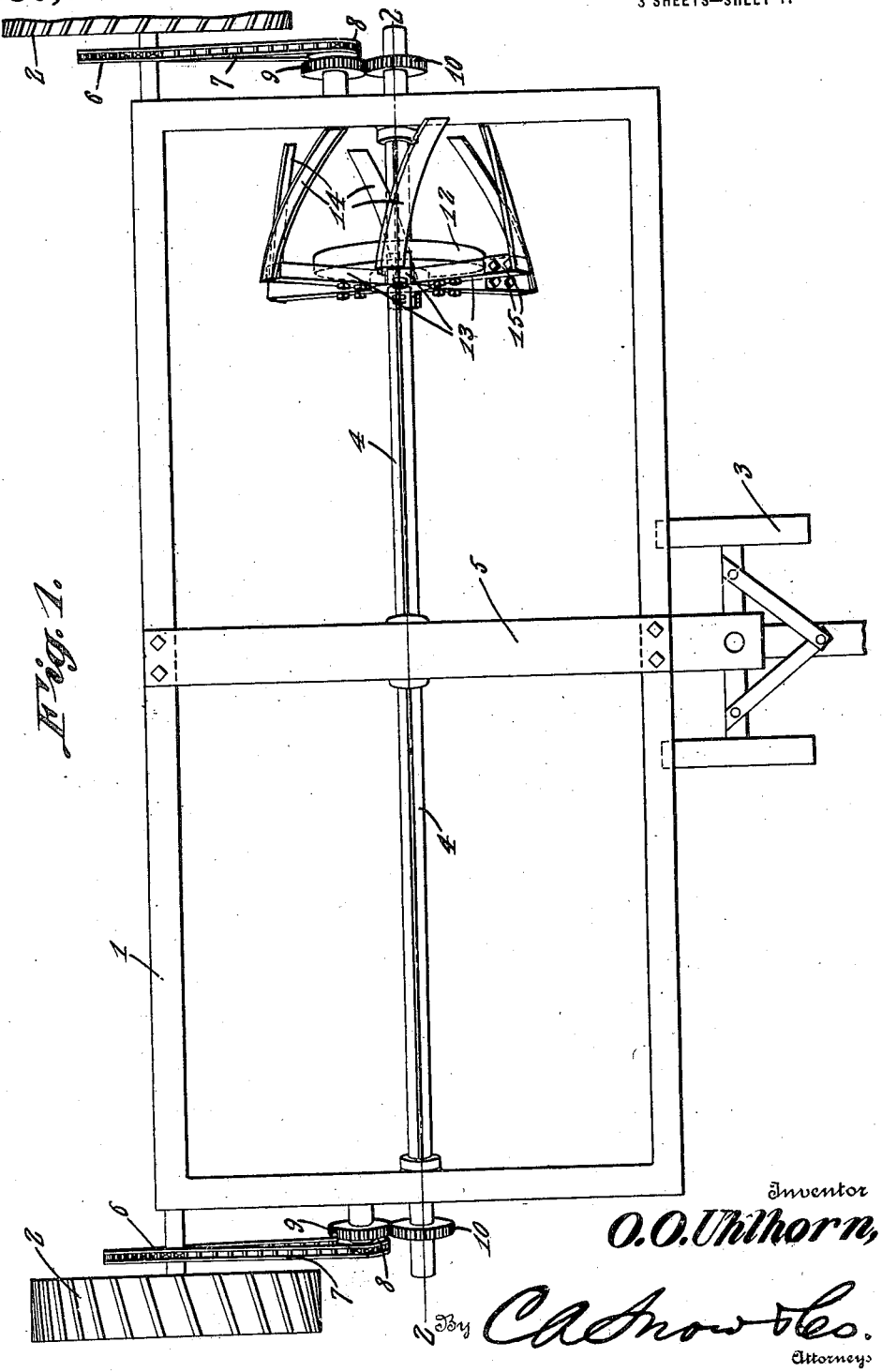

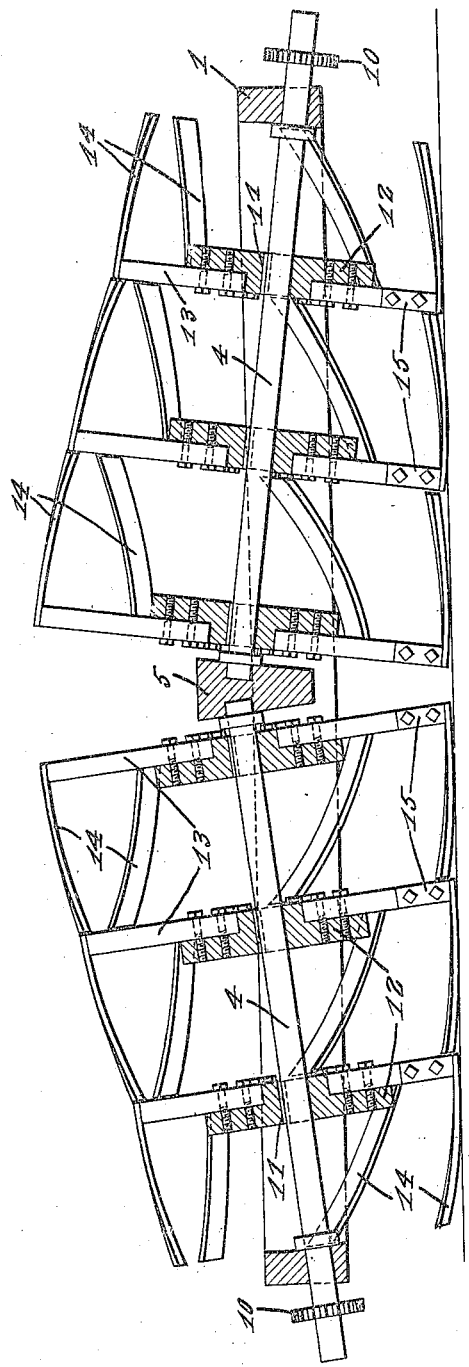

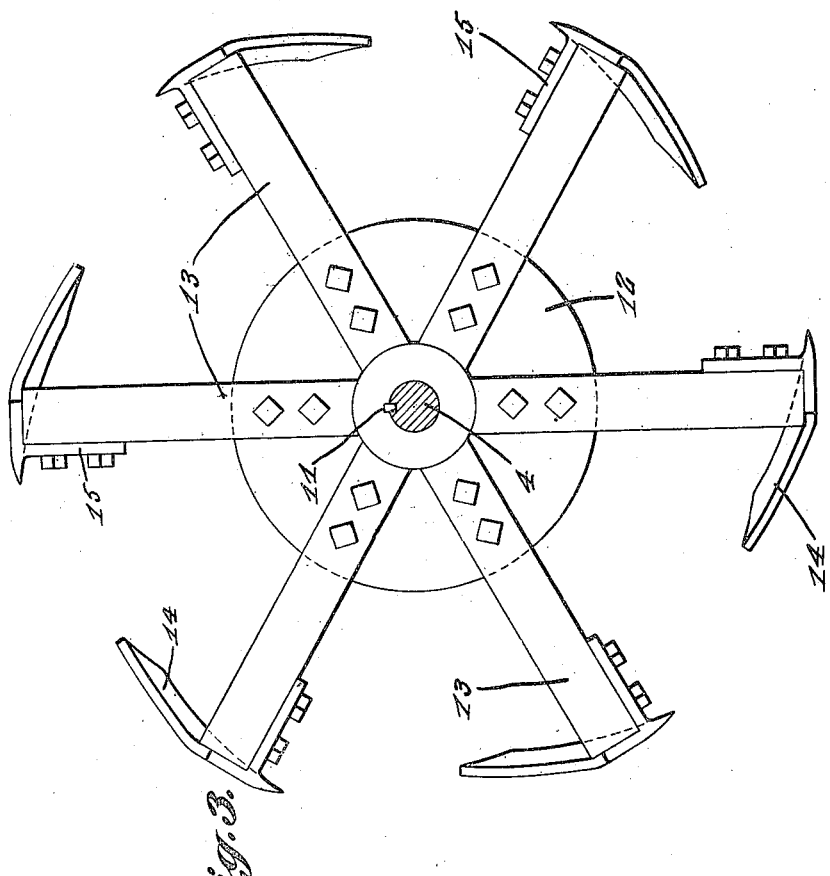

OTTO O. UHLHORN, OF LISBON, NORTH DAKOTA.

CULTIVATOR.

1,380,505.

Specification of Letters Patent.   Patented June 7, 1921.

Application filed October 21, 1920.  Serial No. 418,515.

*To all whom it may concern:*

Be it known that I, OTTO O. UHLHORN, a citizen of the United States, residing at Lisbon, in the county of Ransom and State of North Dakota, have invented a new and useful Cultivator, of which the following is a specification.

This invention relates to a cultivator for weeding and for like purposes, one of its objects being to provide a machine utilizing rotary blades adapted to be actuated positively during the forward movement of the machine so that the blades will engage and cut into the surface of the soil, the blades being so shaped as to coöperate to form substantially conical cultivating units.

Another object is to provide cultivating units adapted to revolve against the line of draft at such a speed as to cause the blades when moving forwardly underneath the axis of rotation, to travel practically twice as fast as the balance of the machine to which the blades are connected.

A still further object is to provide blades so shaped as to produce a shearing action upon the soil and vegetation in the paths thereof and prevent trash from gathering on the blades.

A still further object is to provide blades which will not pack or push against the soil at any time during their operation but will always present a cutting edge thereto.

With the foregoing and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings the preferred form of the invention has been shown.

In said drawings—

Figure 1 is a plan view of a machine having the present improvements combined therewith, only one of the cutting units being illustrated.

Fig. 2 is a vertical transverse section through the cutting units of the machine, said section being taken on the line 2—2, Fig. 1, and showing the shaft sections in elevation.

Fig. 3 is an enlarged side elevation of one of the cultivating units.

Referring to the figures by characters of reference 1 designates a frame the rear portion of which is carried by supporting wheels 2 while the front portion can be carried by a truck 3. Mounted for rotation within the frame 1 are transverse shafts 4 the inner ends of which are journaled within the central portion of the frame 1 as shown at 5 while the outer ends are suitably journaled at the sides of the frame 1. Thus it will be seen that the two shafts converge upwardly toward the center of the frame, forming an obtuse angle. A sprocket 6 can be arranged to rotate with each of the wheels 2 and motion is adapted to be transmitted in any desired manner from these sprockets to the shaft 4 so as to cause the shafts to rotate oppositely to the wheels 2. For example each sprocket 6 can transmit motion through a chain 7 to a sprocket 8 revoluble with a gear 9. This gear can in turn mesh with a gear 10 secured to the shaft 4. Obviously various other means may be provided for driving the shaft 4 in the manner desired.

Secured on each of the shafts 4 is a series of cultivating units each of which includes a hub 11 keyed on the shaft and having an annular flange 12 to which is secured radial spokes 13. Extending over the outer end of each spoke is one end of an elongated blade 14 provided with a shank 15 bolted or otherwise detachably secured to one of the sides of the spoke. The blades are spirally arranged so that the inner end of each blade will first engage the ground during the rotation of the unit, the advancing or cutting edge of the blade thus setting up a shearing action upon the soil and the roots of the vegetation to be removed. As shown in Fig. 2 the different units on each shaft 4 are of different sizes so that when they are all assembled the blades of the several units on each shaft will lie within the surface of an imaginary truncated cone.

Obviously when the machine is drawn forward the two sets of cultivating elements will rotate oppositely to the wheels 2 so that each blade 14 will be brought into contact with the ground, the inner end of each blade first engaging the ground after which the remaining portion of the cutting edge of each blade gradually cuts through the soil. It will be apparent that by arranging the blades as shown and described the cutting action will take place much more readily and with the use of less power than should straight edges be brought direct against the surface of the ground. Furthermore as each blade exerts a shearing cut it will positively remove the vegetation in the path thereof as well as loosen the crust of the soil and instead of allowing the cut weeds and the like to hang on the edges and pack or clog the machine, the curvature of the edges will result in lateral deflection of the vegetation and its gradual detachment from the blades.

It is to be understood that any desired means may be employed for raising and lowering the frame 1 relative to the ground and for throwing the cutting elements out of gear with the wheels 2 when, for example, the said blades come into contact with unyielding obstructions such as rocks, and thick roots.

What is claimed is:—

A cultivator comprising a wheel supported structure, transverse shafts carried thereby and diverging downwardly and laterally, a plurality of cultivating units on each shaft, each of said units including spiral blades extending laterally toward the outer end of its shaft, the blades of all of the units on each shaft coöperating to define a cone frustum and means for simultaneously rotating the shafts to move the lowermost blades of the cultivating units forwardly at a greater speed than the forward movement of the structure, each of said blades producing a shearing cut upon material in the path thereof.

In testimony that I claim the foregoing as my own, I have hereto affixed my signature in the presence of two witnesses.

OTTO O. UHLHORN.

Witnesses:
S. D. ADAMS,
L. A. CHALLEY.